United States Patent [19]

Zirk et al.

[11] Patent Number: 5,667,234
[45] Date of Patent: Sep. 16, 1997

[54] BICYCLE, A FRONT FORK AND A SHOCK ABSORBER MECHANISM FOR THE FRONT FORK OF A BICYCLE

[75] Inventors: Wolfgang Zirk, Dittelbrunn; Gerald Bischof, Niederwerrn, both of Germany

[73] Assignee: Fichtel & Sachs AG, Schweinfurt, Germany

[21] Appl. No.: 577,626

[22] Filed: Dec. 22, 1995

[30] Foreign Application Priority Data

Dec. 24, 1994 [DE] Germany .......................... 44 46 756.7

[51] Int. Cl.$^6$ ........................................................ B62K 25/08
[52] U.S. Cl. ........................... 280/276; 280/279; 267/141
[58] Field of Search ........................................ 280/276, 279,
280/275, 283, 284; 267/141.1, 141, 141.2,
219, 64.26

[56] References Cited

U.S. PATENT DOCUMENTS

| 5,284,352 | 2/1994 | Chen | 280/276 |
| 5,367,918 | 11/1994 | Chang et al. | 280/279 X |
| 5,445,401 | 8/1995 | Bradbury | 280/276 |
| 5,449,189 | 9/1995 | Chen | 280/276 |
| 5,470,090 | 11/1995 | Stewart et al. | 280/276 |

FOREIGN PATENT DOCUMENTS

| 0807491 | 6/1951 | Germany . |
| 9400116 | 4/1994 | Germany . |
| 9400166 | 4/1994 | Germany . |

Primary Examiner—Victor E. Johnson
Attorney, Agent, or Firm—Nils H. Ljungman and Associates

[57] ABSTRACT

A telescoping front fork of a bicycle which has a spring system which acts between an upper cylindrical housing and a lower cylindrical housing and includes at least one suspension spring, a supplemental spring and a spring in the rebound direction, each of which is made of a compressible elastic foamed, or expanded cellular elastomer. The spring constant of the supplemental spring is lower than that of the suspension spring. This arrangement has the advantage that acceleration peaks are reduced during the transition from a situation in which the two cylindrical houses are at rest and one in which the two cylindrical houses slide in relation to one another. The breakaway force is oriented to the weaker supplemental spring in connection with the rebound direction spring and as the support force increases, the suspension spring is compressed on a delayed basis, without any measurable additional breakaway force.

13 Claims, 3 Drawing Sheets

BICYCLE, A FRONT FORK AND A SHOCK ABSORBER MECHANISM FOR THE FRONT FORK OF A BICYCLE

BACKGROUND OF THE INVENTION

1. Field of the Invention

The present invention generally relates to the construction of a spring system on a tubular leg of the front fork of a bicycle.

2. Background Information

German Patent No. 94 00 166 describes a known shock absorber mechanism consisting of a combination of shock absorbing springs with rubber rings and a mounting block, whereby the damping takes place by means of the friction against the cylindrical inner part which carries a friction lining. The absence of damping fluid simplifies the system, but it may have disadvantages in terms of breakaway force and damping.

OBJECT OF THE INVENTION

An object of the present invention is to create a spring system for installation in a tubular leg on a telescoping front fork for bicycles, which spring system can preferably improve the ride comfort, in particular in the range of small spring travels, by means of a soft response of the spring system and low breakaway forces.

SUMMARY OF THE INVENTION

The present invention teaches that this object can be accomplished, in accordance with at least one preferred embodiment, by a spring system comprising at least one suspension spring, at least one guide ring, at least one cage, and at least one supplemental spring, whereby the suspension springs and the cage are located one behind the other with bias between the bias screw and a stop ring in the upper cylindrical housing, and whereby the supplemental spring, when it is uncoupled from the bias of the suspension springs, creates the active connection to the lower cylindrical housing as a compression spring.

Other advantageous refinements of the present invention are disclosed herebelow.

When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

In summary, one aspect of the present invention resides broadly in a bicycle comprising: a front wheel hub on which there is rotationally mounted a front wheel; a frame including a front fork structure comprising two legs and a bridge connecting the two legs; the front fork structure comprising at least one tubular leg, the at least one tubular leg comprising: an upper cylindrical housing connected to the bridge; a lower cylindrical housing; the upper cylindrical housing and the lower cylindrical housing being coaxially oriented with respect to one another to retract and extend one within the other; spring means; the spring means comprising upper spring means and lower spring means; the lower spring means operatively connecting the upper cylindrical housing and the lower cylindrical housing; the lower spring means being disposed to prevent the upper cylindrical housing and the lower cylindrical housing from moving apart and extending from one another excessively on rebound; the upper spring means comprising compression spring means being disposed in the upper cylindrical housing; an additional spring; the additional spring being disposed between the upper spring means and the lower spring means; and an additional hollow cylindrically shaped member being disposed within at least one of the upper and the lower cylindrical housing; the additional hollow cylindrical member being substantially closed upwardly; and the additional spring being disposed within the additional hollow cylindrical member.

Another aspect of the present invention resides broadly in a bicycle front fork structure comprising two legs and a bridge connecting the two legs; the front fork structure comprising at least one tubular leg, the at least one tubular leg comprising: an upper cylindrical housing connected to the bridge; a lower cylindrical housing; the upper cylindrical housing and the lower cylindrical housing being coaxially oriented with respect to one another to retract and extend one within the other; spring means; the spring means comprising upper spring means and lower spring means; the lower spring means operatively connecting the upper cylindrical housing and the lower cylindrical housing; the lower spring means being disposed to prevent the upper cylindrical housing and the lower cylindrical housing from moving apart and extending from one another excessively on rebound; the upper spring means comprising compression spring means being disposed in the upper cylindrical housing; an additional spring; the additional spring being disposed between the upper spring means and the lower spring means; and an additional hollow cylindrically shaped member being disposed within at least one of the upper and the lower cylindrical housing; the additional hollow cylindrical member being substantially closed upwardly; and the additional spring being disposed within the additional hollow cylindrical member.

An additional aspect of the present invention resides broadly in a tubular leg of a front fork of a bicycle, comprising: an upper cylindrical housing connected to a bridge; a bias screw which forms the upper closure of the upper cylindrical housing and can be screwed to a greater or lesser depth into the upper cylindrical housing; a lower cylindrical housing with a support tube which is oriented coaxially with this cylindrical housing; at least one sliding ring; a spring between the upper cylindrical housing and the lower cylindrical housing, which spring acts in the rebound direction; and a spring system, characterized by the fact that the spring system includes at least one suspension spring, at least one guide ring, at least one cage, and at least one supplemental spring, whereby the suspension springs and the cage are located one behind the other with bias between the bias screw and a stop ring in the upper cylindrical housing, and whereby the supplemental spring, when it is uncoupled from the bias of the suspension springs, creates the active connection to the lower cylindrical housing as a compression spring.

DESCRIPTION OF THE PREFERRED EMBODIMENT

Figure 1:
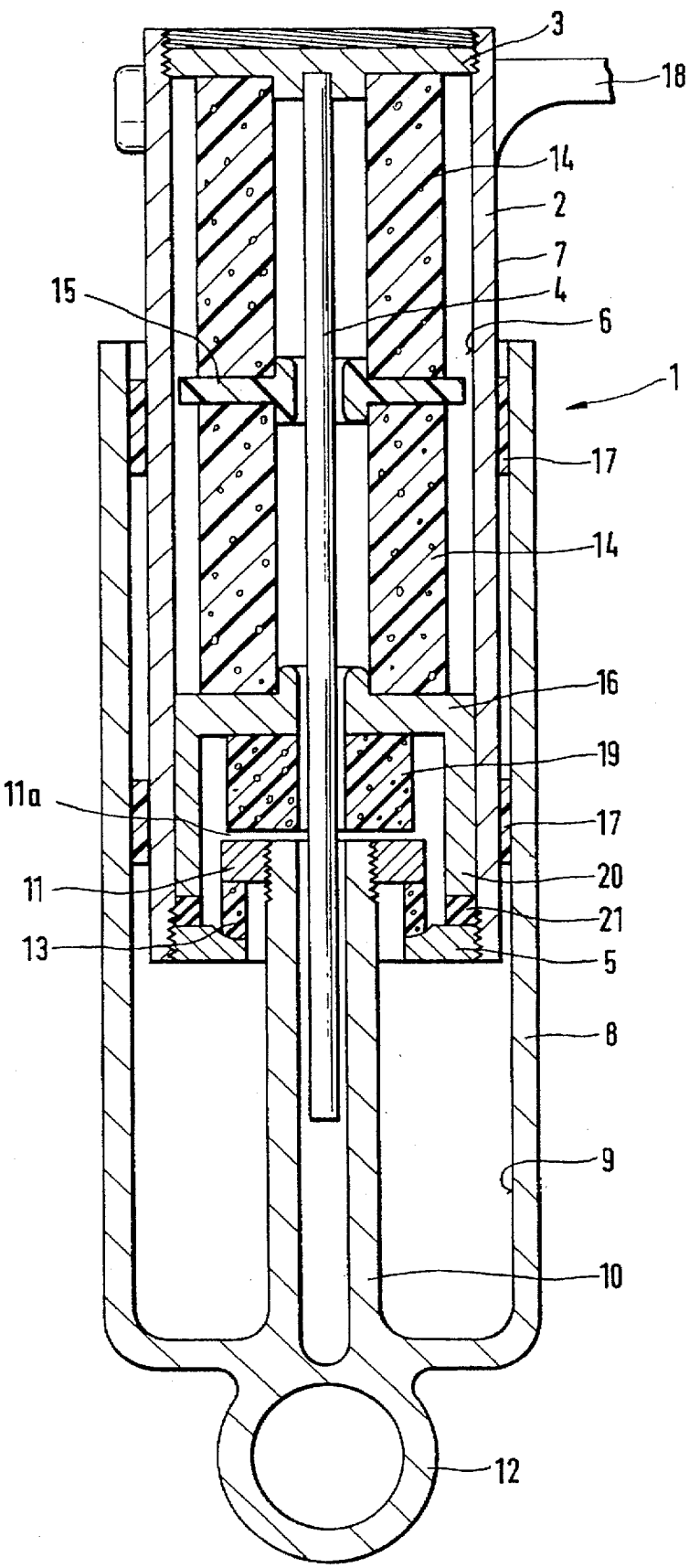
FIG. 1 schematically illustrates one embodiment of a tubular leg of a telescoping front fork for bicycles, showing an upper and lower cylindrical housing which are biased in relation to one another by means of a spring system.

As illustrated in FIG. 1, the complete tubular leg 1 of a telescoping front fork for bicycles can comprise an upper cylindrical housing 2 and a lower cylindrical housing 8, whereby a telescoping front fork can comprise two such tubular legs 1 which can be connected to one another by means of a bridge 18. The bridge 18 can preferably be connected to the frame of the bicycle and thus to the unsuspended part of the bicycle. The two cylindrical housings 2 and 8 can be partly inserted coaxially inside one another and can be displaced with respect to one another. At least one friction bearing that includes sliding rings 17 can essentially guarantee low friction during such movements. The sliding rings 17 in this embodiment can be non-detachably connected to the outer cylindrical surface 7 of the upper cylindrical housing 2, and may slide over an inner cylindrical surface 9 in the lower cylindrical housing 8, whereby attention essentially must be paid to selecting a good friction pair with regard to the materials of which the friction partners are made, as well as good surface characteristics of the inner cylindrical surface 9.

Preferably inside the first cylindrical housing 2, there can be a spring system which comprises at least one suspension spring 14 and an additional spring or supplemental spring 19. The suspension springs 14 and the supplemental spring 19 can be located in series one above the other, and preferably comprise a compressible elastic foamed, or expanded cellular elastomer, whereby the spring constant of the supplemental spring 19 is preferably lower than the spring constant of the suspension springs 14. The lower cylindrical housing 8, in addition to having an eye 12 for fastening the axle of a front wheel of a bicycle, can have a support tube 10 which can be provided on the upper end with a stop collar 11, which stop collar 11 can preferably act as an axial support for the supplemental spring 19. The support springs 14 can lie essentially concentric to one another, whereby they can be held in their position, both with respect to one another and with respect to an inner cylindrical surface 6 of the upper cylindrical housing 2, by means of a guide ring 15.

The guide rings 15 can be made of a plastic material, and when necessary, preferably slide essentially without major resistance on the inner cylindrical surface 6. As an abutment for the bias forces from the suspension springs 14 of the spring system, a stop ring 5 can be connected with the upper cylindrical housing 2, whereby the stop ring 5 can be used to establish the rest position by way of a rebound-direction spring 13 positioned against the stop collar 11. Between the supplemental spring 19 and the suspension springs 14 there can be an additional hollow cylindrically shaped member or cage 16 which could preferably have a tubular extension 20 to create the proper bias conditions. The cage 16 can be in contact under bias with its ring-shaped terminal surface and by means of a soft stop 21 against the stop ring 5. This bias can preferably be generated by the suspension springs 14 which can be supported on the axially opposite side on a bias screw 3. The supplemental spring 19 could work against this force direction, since the supplemental spring 19 can be supported against the support tube 10 and engaged on the other side of the cage 16. At rest, the force of the supplemental spring 19 can be lower than that of the suspension springs 14 on account of the lower bias and the lower spring constant, a situation which can be achieved by means of the design of the springs 19 and 14, but above all by preferably selecting the appropriate length of the tubular extension 20. The bias screw 3 can be screwed at different depths into the upper cylindrical housing 2, as a result of which the bias of the suspension springs 14 can be adjusted, within limits.

In accordance with at least one preferred embodiment of the present invention, if the bicycle is ridden over a road which has uneven spots of low height, the supplemental spring 19 is compressed during deflection, whereby the upper cylindrical housing 2 and the lower cylindrical housing 8 are pushed into one another, and the stop collar 11 breaks away from its biased position with respect to the stop ring 5 and the rebound-direction spring 13. At the low spring travels of the spring systems described above, the suspension springs 14 essentially would not be used, and the tubular extension 20 of the cage 16 would essentially remain in place with respect to the stop ring 5.

In accordance with at least one preferred embodiment of the present invention, the supplemental spring 19 is compressed to its block length only in the event of longer spring travels when the bicycle is ridden over much rougher roads, and force is transmitted from the supplemental spring 19 to the guide cage 16, which then preferably breaks away from its position defined by the tubular extension 20, when the bias force generated by the suspension springs 14 is exceeded by the carrying force. Then the suspension springs 14 can be compressed except for the spring travel, which could mark the upper culmination point of the force curve or the maximum possible compressibility of the suspension springs 14. If the force generated by the uneven spots in the road decreases, first the tubular extension 20 is preferably pushed until it comes into contact with the stop ring 5 and then the stop collar 11 can come into contact with the stop ring 5 by means of the rebound-direction spring 13.

In other words, as the bicycle would travel over rougher terrain, the supplemental spring 19 can be compressed to a point where it may not be able to be compressed further. Force can then be transmitted by way of the guide cage 16 to the suspension springs 14.

In accordance with at least one embodiment of the present invention, FIG. 1 could be considered to represent, essentially, a moment in time in the operation of a tubular leg 1 according to the present invention. As the front wheel of the bicycle encounters a bump in a road surface, the bicycle can essentially maintain momentum and direction. When the bicycle initially hits the bump, the bump can cause the front wheel of the bicycle to force the lower cylindrical housing 8 upward by way of the fastening eye 12 connection to the axle of the front wheel. This upward movement of the lower cylindrical housing 8 can cause compression of the supplemental spring 19 and possibly also of the suspension spring 14. The bicycle wheel then travels to the other side of the bump, and in doing so, the front wheel of the bicycle can return to a preferably normal road surface. At this point, the lower cylindrical housing 8, by way of fastening eye 12, begins to return to an essentially normal position.

In a moment of operation of a tubular leg 1 according to one embodiment of the present invention, the supplemental spring 19 can be released, or uncoupled from the bias of the suspension springs 14. As can be seen in FIG. 1, the lower cylindrical housing 8 can move downward as the front wheel of the bicycle returns to an essentially normal operating position after a bump. A gap 11a can essentially occur at that moment between the supplemental spring 19 and the combined stop collar 11 and support tube 10. In the final moment of return of the tubular leg 1 to normal operating position, the cage 16 and the supplemental spring 19 can then move downward making an active connection, by compression, with the lower cylindrical housing 8 by way of the supplemental spring 19. The compression, or the extra compression provided by the bump on the suspension springs 14 is essentially released and the supplemental spring 19, again, is not in a relationship of direct compression contact with respect to the suspension springs 14.

To center all the elements which participate in the spring system, a centrally-located guide rod 4 can preferably extend from the bias screw 3 into the interior of the support tube 10.

The use of a lubricant can be advantageous, e.g. shock absorber oil, which can preferably improve the mobility of all the elements which would participate in the spring system.

The above-mentioned adjustability of the load bearing capacity of the spring system as a result of the bias screw 3, which can be screwed to different depths, can create a bias range of the suspension springs 14 which can be expanded even further by replacing the suspension springs 14 and using springs which have higher or lower spring constants. It has been shown that it can be advantageous, for drivers of different weights, to provide several sets of suspension springs 14 which have different spring constants, to achieve a comparably comfortable ride.

Figure 2:
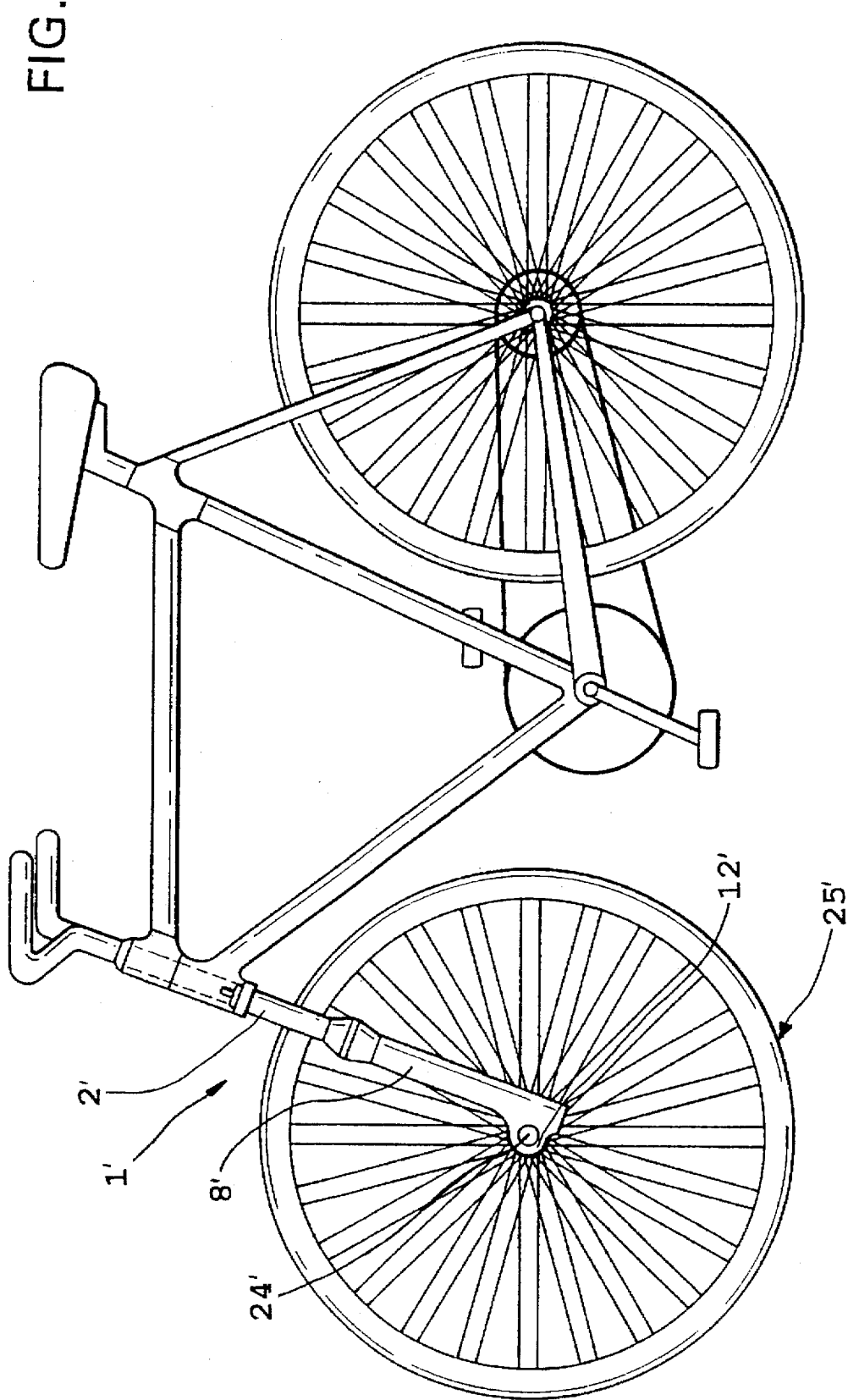
FIG. 2 is a diagram of a bicycle from a side view, showing various components of one embodiment of the present invention.

FIG. 2 illustrates, in accordance with at least one embodiment of the present invention, a bicycle from a side view showing a tubular leg 1' of a bicycle. This drawing illustrates a connection of the tubular leg 1' by means of an eye 12' to an axle 24' of a front wheel 25' of a bicycle.

Figure 2A:
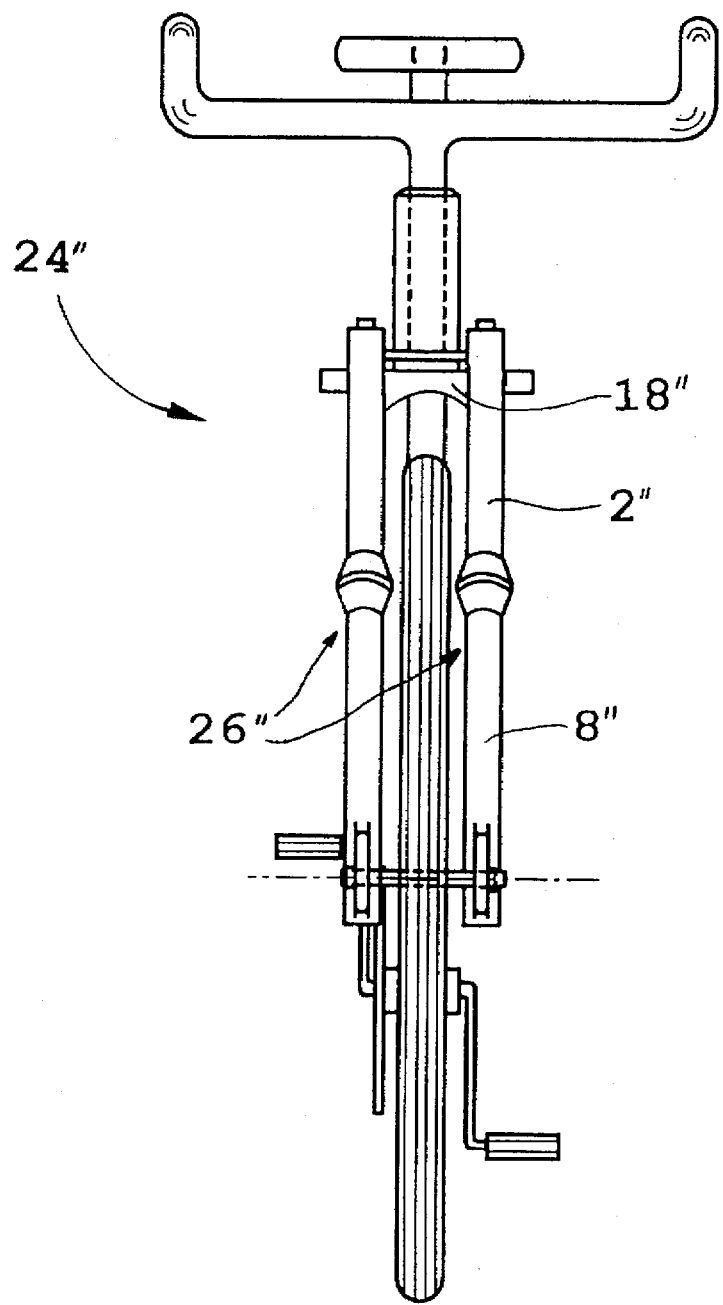
FIG. 2a is a diagram of a bicycle from a front view illustrating various components of one embodiment of the present invention.

FIG. 2a, in accordance with at least one embodiment of the present invention, illustrates the front assembly 24" of a bicycle from a front view. This illustration shows a bridge 18" connecting the two tubular legs 26". Also shown are the upper cylindrical housing 2" and the lower cylindrical housing 8" of the tubular legs 26".

One feature of the invention resides broadly in the tubular leg of a front fork of a bicycle, comprising an upper cylindrical housing connected to a bridge, a bias screw which forms the upper closure of the upper cylindrical housing and can be screwed to a greater or lesser depth into the upper cylindrical housing, a lower cylindrical housing with a support tube which is oriented coaxially with this cylindrical housing, at least one sliding ring, a spring between the upper cylindrical housing and the lower cylindrical housing, which spring acts in the rebound direction, and a spring system, characterized by the fact that the spring system includes at least one suspension spring, at least one guide ring, at least one cage and at least one supplemental spring, whereby the suspension springs and the cage are located one behind the other with bias between the bias screw and a stop ring in the upper cylindrical housing, and whereby the supplemental spring, when it is uncoupled from the bias of the suspension springs, creates the active connection to the lower cylindrical housing as a compression spring.

Another feature of the invention resides broadly in the tubular leg characterized by the fact that the suspension springs, the supplemental spring and the rebound direction spring consist of a compressible elastic foamed, or expanded cellular elastomer.

Yet another feature of the invention resides broadly in the tubular leg characterized by the fact that the spring constant of the supplemental spring is less than the spring constant of the suspension springs.

Still another feature of the invention resides broadly in the tubular leg characterized by the fact that the mobility of the spring system is increased by a lubricant.

A further feature of the invention resides broadly in the tubular leg characterized by the fact that the cage has a tubular extension which separates the bias of the suspension springs and the bias of the supplemental spring.

Another feature of the invention resides broadly in the tubular leg characterized by the fact that the design of the spring system can be varied as a function of higher or lower vehicle weights by the selection of suspension springs which have higher or lower spring constants.

Examples of bicycles, and components thereof, in which the embodiments of the present invention may be employed, may be found in the following U.S. patents: U.S. Pat. No. 5,324,059, which issued to Bryne on Jun. 28, 1994; No. 5,312,125 which issued to Tse-acu-a-o-shu on May 17, 1994; No. 5,242,182, which issued to Bezerra et al. on Sep. 7, 1993; and No. 5,240,268, which issued to Allsop et al. on Aug. 31, 1993.

Examples of materials which could possibly be used in conjunction with the embodiments of the present invention as set forth hereabove can possibly be found in the following U.S. patents: U.S. Pat. No. 4,932,637 which issued to Jarret on Jun. 12, 1990; and U.S. Pat. No. 5,014,967 which issued to Wolf and Pletsch on May 14, 1991.

Examples of types of materials, with various coefficients of friction, which could possibly be used in conjunction with the embodiments of the present invention as set forth hereinabove can possibly be found in the following U.S. patents: U.S. Pat. No. 4,703,075 issued Oct. 27, 1987 to Egami; No. RE32,514 (Reissue of U.S. Pat. No. 4,473,676) issued Oct. 6, 1987 to Steklenski; and No. 4,714,740 issued Dec. 22, 1987 to Lee and Golden.

Examples of types of lubricants which could possibly be used in conjunction with the embodiments of the present invention as set forth hereabove can possibly be found in the following U.S. patents: U.S. Pat. No. 4,372,863 which issued to Elliott et al. on Feb. 8, 1983; No. 4,376,711 which issued to Shaub on Mar. 15, 1983; and No. 4,459,223 which issued to Shaub et al. on Jul. 10, 1984.

Examples of types of elastomeric materials, types of elastomeric springs, and components thereof, which could possibly be used in conjunction with the embodiments of the present invention as set forth hereinabove can possibly be found in the following U.S. patents: U.S. Pat. No. 4,369,284 which issued to Chen on Jan. 18, 1983; No. 5,192,057 which issued to Wydra and Geick on Mar. 9, 1993; and No. 5,351,844 which issued to Carlstedt on Jun. 1, 1994.

In general, a rebound is usually considered to be the recovery of an entity, or a system which has had a setback, or been struck in some manner. In the case of a bicycle, the rebound of a bicycle wheel is generally considered to be when the wheel of the bicycle is recovering from hitting a bump and the wheel is returning to a relatively normal operational condition involving a relatively smooth riding surface. In the case of a bicycle utilizing an embodiment of a shock absorber mechanism, such as that of the present invention, the original force of hitting a bump is damped by the mechanism; additionally, as the mehcanism is recovering from the bump, or rebounding, it may be necessary to employ a spring in the mechanism to damp what could be considered excessive rebound. A rebound-direction spring employed in a bicycle shock absorber mechanism can make a bumpy ride more comfortable.

A rebound could also be considered to be the reaction of the bicycle after it has recovered from a bump and is returning to smooth riding operation. In other words, first of all the bicycle would hit the bump and the shock absorber mechanism would be compressed; secondly, as the wheel has gone over the bump, the shock absorber mechanism can be somewhat extended as the wheel begins the return to the riding surface; and thirdly, there can be an essentially very minor bump, as the shock absorber mechanism again is essentially slightly compressed, if the original bump was somewhat large. This slight, or secondary compression, may in this case be considered as occurring on rebound, even though it is essentially the same as hitting a small bump.

As mentioned hereinabove, in the case of a bicycle hitting a bump, rebound is considered to be when the wheel goes back down to the riding surface after a wheel has hit a bump, the shock absorber mechanism has been compressed as necessary, and the wheel has left the bump. If a bicycle, utilizing an embodiment of the present invention however, runs over a depression, or a hole, or runs off a curb, rebound can be considered to be very different.

As the bicycle would go over the edge of a hole, firstly, the wheel of the bicycle would drop, thus extending the shock absorber mechanism which would preferably absorb any impact as the wheel would hit the bottom of the hole; secondly, the bicycle wheel would come to, and hit, the opposite edge of the hole and cause the wheel, in this case, to move upward, or rebound; and thirdly, the bicycle would begin to return to normal operation as the shock absorber mechanism loses compression, or in other words, rebounds again.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 44 46 756.7, filed on Dec. 24, 1994, having inventors Wolfgang Zirk and Gerald Bischof, and DE-OS P 44 46 756.7 and DE-PS P 44 46 756.7, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A bicycle front fork structure comprising two legs and a bridge connecting said two legs;
    said two legs comprising at least one tubular leg, said at least one tubular leg comprising:
        an upper cylindrical housing connected to said bridge;
        a lower cylindrical housing;
            said upper cylindrical housing and said lower cylindrical housing being coaxially oriented with respect to one another to retract and extend one within the other;
        spring means;
            said spring means comprising upper spring means and lower spring means;
            said lower spring means operatively connecting said upper cylindrical housing and said lower cylindrical housing;
            said lower spring means being disposed to prevent said upper cylindrical housing and said lower cylindrical housing from moving apart and extending from one another excessively on rebound;
            said upper spring means comprising compression spring means being disposed in said upper cylindrical housing; an additional spring;
            said additional spring being disposed between said upper spring means and said lower spring means;
        an additional hollow cylindrically shaped member being disposed within at least one of said upper and said lower cylindrical housings;
            said additional hollow cylindrical member being substantially closed upwardly;
            said additional spring being wholly disposed within said additional hollow cylindrical member; and
            said additional hollow cylindrical member being disposed to permit transfer of a first force between said upper spring means and said upper cylindrical member.

2. The bicycle front fork structure according to claim 1, wherein:
    said upper cylindrical housing comprises a lower end disposed adjacent said lower cylindrical housing;
    said bicycle front fork structure further comprises a stop ring;
    said stop ring is attached to said lower end of said upper cylindrical housing;
    said upper cylindrical housing comprises an upper end axially opposite said lower end;
    said bicycle front fork structure further comprises an upper closure;
    said upper closure is disposed in said upper end of said upper cylindrical housing;
    said additional hollow cylindrical member comprises an upper end and an axially opposite lower end;
    said lower end of said additional hollow cylindrical member is disposed adjacent to said stop ring;
    said stop ring is disposed to limit axial displacement of said additional hollow cylindrical member towards said lower end of said upper cylindrical member; and
    said upper spring means is disposed between said upper closure and said upper end of said additional hollow cylindrical member.

3. The bicycle front fork structure according to claim 2, wherein:
    said upper closure comprises a bias screw;
    said bias screw is threadingly engaged in said upper end of said upper cylinder housing; and
    said bias screw is disposed to permit adjustment of the preload compression of said upper spring means between said bias screw and said additional hollow cylindrical member.

4. The bicycle front fork structure according to claim 3, wherein:

said upper spring means has a spring constant characteristic; and said spring constant characteristic comprises means for adjusting the stiffness of said upper spring means.

5. The bicycle front fork structure according to claim 4, wherein:

said additional spring comprises at least one supplemental spring;

said upper spring means comprises at least one suspension spring;

said lower spring means comprises at least one rebound spring; and at least one of: said at least one supplemental spring, said at least one suspension spring, and said at least one rebound spring comprises a compressible, elastic, foamed, cellular elastomer.

6. The bicycle front fork structure according to claim 5, wherein:

said at least one tubular leg comprises a lubricant;

said lubricant is disposed within said upper cylinder housing;

said lubricant is disposed to increase the mobility of said upper spring means;

said lubricant is disposed to increase the mobility of said additional spring;

said upper spring means comprises a plurality of suspension springs;

said upper spring means comprises at least one guide ring;

said at least one guide ring is disposed between two adjacent ones of said plurality of suspension springs;

said upper cylindrical housing has en external cylindrical surface;

said lower cylindrical housing has an internal cylindrical surface;

said bicycle front fork structure further comprises at least one sliding ring;

said at least one sliding ring is disposed between said external surface of said upper cylindrical housing and said internal surface of said lower cylindrical housing for guiding relative axial displacement between said upper and lower cylindrical housings;

said lower cylindrical housing comprises a support tube;

said support tube is disposed coaxially inside said lower cylindrical housing; and said additional spring is disposed between said support tube and said upper end of said additional hollow cylindrical member.

7. The bicycle front fork structure according to claim 1, wherein:

said additional spring is disposed to permit transfer of a second force in a first range of forces between said lower cylindrical housing and said additional hollow cylindrical member upon movement of said lower cylindrical housing towards said upper cylindrical housing; and said additional spring is also disposed to permit transfer of the second force in the first range of forces from said lower cylindrical housing towards said upper spring means.

8. The bicycle front fork structure according to claim 7, wherein:

said additional spring is disposed to permit transfer of a third force in a second range of forces between said lower cylindrical housing and said upper spring means upon movement of said lower cylindrical housing towards said upper cylindrical housing; and said additional spring is also disposed to permit transfer of the third force in the second range of forces from said lower cylindrical housing towards said upper spring means.

9. The bicycle front fork structure according to claim 8, wherein:

the first range of forces comprises a maximum force;

the second range of forces comprises a minimum force; and said bicycle front fork structure comprises means for holding said upper spring means in bias to generate the maximum force in the first range of forces to be less than the minimum force in the second range of forces.

10. The bicycle front fork structure according to claim 9, wherein:

said upper cylindrical housing comprises an upper end and a lower end;

said upper end of said upper cylindrical housing is disposed axially opposite said lower end of said upper cylindrical housing;

said means for holding said upper spring means in bias comprises a screw;

said screw is threadingly engaged in said upper end of said upper cylindrical housing;

said upper spring means is disposed between said screw and said additional hollow cylindrical member;

said lower cylindrical housing comprises an upper end and a lower end;

said upper end of said lower cylindrical housing is disposed axially opposite said lower end of said lower cylindrical housing;

said lower end of said upper cylindrical housing is disposed adjacent to said upper end of said lower cylindrical housing;

said bicycle front fork structure comprises a stop;

said stop is a ring-shaped member;

said stop is fixedly disposed within said lower end of said upper cylindrical housing;

said stop is concentric with said upper cylindrical housing;

said additional hollow cylindrical member is disposed within said upper cylindrical housing between said upper spring means and said stop;

said additional hollow cylindrical member comprises a tubular extension;

said tubular extension is coaxial with the remainder of said additional hollow cylindrical member;

said tubular extension is disposed to extend from the remainder of said additional hollow cylindrical member towards said stop; and said stop is disposed to contact said tubular extension to limit axial displacement of said additional hollow cylindrical member towards said lower end of said upper cylindrical housing.

11. The bicycle front fork structure according to claim 10, wherein:

said lower cylindrical housing comprises a tubular member;

said tubular member is oriented coaxially with the remainder of said lower cylindrical housing;

said tubular member has a first end and a second end;

said second end of said tubular member is disposed axially opposite said first end of said tubular member;

said tubular member is disposed at least partially within said lower cylindrical housing;

said tubular member is disposed to extend from said lower end of said lower cylindrical housing towards said upper end of said lower cylindrical housing;

said tubular member is disposed to extend through said stop;

said second end of said tubular member is disposed between said stop and said upper end of said upper cylindrical housing;

said additional spring is a first spring;

said lower spring means comprises a second spring;

said second spring is connected between said second end of said tubular member and said stop; and said second spring is disposed to permit transfer of a fourth force between said second end of said tubular member and said stop upon movement of said lower cylindrical housing away from said upper cylindrical housing.

12. The bicycle front fork structure according to claim 11, wherein:

said compression spring means of said upper spring means comprises at least one third spring;

at least one of: said additional spring, said second spring and said at least one third spring comprises a compressible elastic foamed cellular elastomer;

said at least one third spring has a spring constant characteristic; and said spring constant characteristic comprises means adjusting said bicycle front fork structure to the weight of the bicycle.

13. The bicycle front fork structure according to claim 12, wherein:

said at least one third spring comprises a plurality of third springs;

said upper spring means comprises at least one disc-shaped member;

said at least one disc-shaped member is disposed between two adjacent ones of said plurality of third springs;

said additional spring has a spring constant characteristic;

said spring constant of said additional spring is less than the spring constant of each of said plurality of third springs;

said bicycle front fork structure comprises a lubricant; and said lubricant is disposed to increase the mobility of both: said upper spring means and said additional spring.

* * * * *